US009734619B2

(12) United States Patent
Strassenburg-Kleciak et al.

(10) Patent No.: US 9,734,619 B2
(45) Date of Patent: Aug. 15, 2017

(54) 3-DIMENSIONAL MAP VIEW WITH BACKGROUND IMAGES

(71) Applicant: Harman Becker Automotive Systems GmbH, Karlsbad (DE)

(72) Inventors: Marek Strassenburg-Kleciak, Garching (DE); Alexey Pryakhin, München (DE); Thomas Feldbauer, München (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 386 days.

(21) Appl. No.: 14/303,517

(22) Filed: Jun. 12, 2014

(65) Prior Publication Data

US 2014/0368496 A1  Dec. 18, 2014

(30) Foreign Application Priority Data

Jun. 17, 2013  (EP) .................................... 13172261

(51) Int. Cl.
 *G06T 7/00* (2017.01)
 *G06T 15/00* (2011.01)
 *G06T 15/04* (2011.01)
 *G06T 17/05* (2011.01)

(52) U.S. Cl.
 CPC .............. *G06T 15/00* (2013.01); *G06T 15/04* (2013.01); *G06T 17/05* (2013.01)

(58) Field of Classification Search
 CPC ....... G06T 7/0065; G06T 15/00; G06T 15/04; G06T 17/05
 See application file for complete search history.

(56) References Cited

U.S. PATENT DOCUMENTS 8,686,992 B1 * 4/2014 Makadia ............ G06K 9/00214
 345/419

OTHER PUBLICATIONS

Jun Zhu et al., "Real-time visualation of virtual geographic environment using the view-dependent simplification method," Proceedings of SPIE, vol. 7143, Oct. 31, 2008, pp. 71432-F-71432-8.

(Continued)

*Primary Examiner* — Xiao Wu
*Assistant Examiner* — Chong Wu
(74) *Attorney, Agent, or Firm* — Artegis Law Group, LLP

(57) ABSTRACT

Techniques for generating a 3-dimensional map view of a navigation system are disclosed. A position module determines a position of a user to which the 3-dimensional map view is to be displayed, a viewing direction and elevation for the user. A map viewer generates the 3-dimensional map view of the map data, wherein for objects located within a predefined distance to the position of the user the position and the representation of each object is calculated taking into account the viewing direction and the elevation, wherein for objects located outside the predefined distance at least one group of objects, to which the objects belong, is identified, and for each identified group the background image is selected and displayed in which the 3-dimensional objects of the identified group are shown from the determined viewing direction and elevation. A display device displays the generated map view.

18 Claims, 8 Drawing Sheets

(56) References Cited

OTHER PUBLICATIONS

Jeschke S. et al., "Layered Environment-Map Imposters for Arbitrary Scenes," Proceedings Graphics Interface 2002, Calgary, Alberta, Canada, May 27-29, 2002, vol. CONF. 28, May 27, 2002.
Liqiang Zhang et al., "Web-based visualization of large 3D urban building models," International Journal of Digital Earth, Mar. 15, 2012, pp. 1-15.
Xavier Decoret et al., "Billboard clouds for extreme model simplification," ACM Transactions on Graphics, vol. 22 No. 3, Jul. 1, 2003, pp. 689-696.
European search report for Application No. EP 13 17 2261, dated Dec. 20, 2013, pp. 1-5.

\* cited by examiner

3-DIMENSIONAL MAP VIEW WITH BACKGROUND IMAGES

CROSS-REFERENCE TO RELATED APPLICATIONS

This application claims the priority benefit of European patent application number 13 172 261.3, filed on Jun. 17, 2013 entitled "3-DIMENSIONAL MAP VIEW WITH BACKGROUND IMAGES," which is hereby incorporated herein by reference.

TECHNICAL FIELD

Various embodiments relate to a method for generating a 3-dimensional map view of a navigation system and to the corresponding navigation system.

BACKGROUND

Navigation systems are now widely used in vehicles in which they can be fixedly or removably installed. Navigation systems assist a driver in route planning and provide directions as well as information on portions of a road network. In order to provide a graphical representation, a database including geographic map data is accessed and a map viewer generates a map view which helps the driver to follow a calculated route.

Information displayed on the navigation system may be easily modified and adapted, e.g. by changing the zoom level of the displayed map portion, by displaying additional objects that might be of relevance to the user or by highlighting objects that may be of relevance to the user. In particular, 3-dimensional map views became popular, as they are of particular value to the user owing to their high recognition quality. Various map objects, such as buildings or other landmarks can be included in 3-dimensional map views or city models output to the user. Depending on the position of the user of the navigation system and the viewing direction, the navigation system calculates the 3-dimensional map view in real time. The computational effort to calculate this 3-dimensional map view in real time for output to the user is time-consuming and the calculation effort can be high in dependence on the number of objects to be displayed.

SUMMARY

Accordingly, a need exists to provide a navigation system and a method for generating a 3-dimensional map view in the navigation system that can generate the 3-dimensional map view with low computational effort.

This need is met by the features of the independent claims. The dependent claims define additional embodiments.

According to one aspect a method for generating a 3-dimensional map view of a navigation system is provided. The navigation system comprises a database including geographic map data, the map data further comprising a plurality of objects for which 3-dimensional data sets are available with which a 3-dimensional representation of the objects is possible. The objects are further grouped into different groups of objects. The database contains for each group a plurality of background images, wherein in each background image of a group the 3-dimensional objects contained in the group are shown from a predefined viewing direction and an elevation from which the objects are viewed. In different background images of a group at least one of the viewing direction and elevation differ from one another. The method comprises the step of determining a position of a user to which the 3-dimensional map view is to be displayed, a viewing direction and an elevation for the user. Furthermore, the 3-dimensional map view of the map data is generated and for objects located within a predefined distance to the position of the user the position and the representation of each object is calculated taking into account the viewing direction and the elevation. For objects located outside the predefined distance at least one group of objects is identified to which the objects belong, and for each identified group the background image is selected and displayed in which the 3-dimensional objects of the identified group are shown from the determined viewing direction and elevation. Furthermore, the generated map view is displayed.

This method helps to keep the computational effort for the generation and displaying of the 3-dimensional map view low, as not all the objects present in the map view have to be calculated and displayed at the calculated position when the display is generated. For objects located at a certain distance from the user, the database comprising different background images, is used and the displaying of the 3-dimensional map view is accelerated by simply selecting a background image showing a group of objects. The background image is selected in such a way that it shows the group of objects in the correct viewing direction and elevation. This use of pre-rendered background images helps to keep the computing effort and time needed to calculate a 3-dimensional map view low.

Preferably, the background images are such that for each group of 3-dimensional objects the group of objects represented in a background image is viewed from a viewpoint and the viewing direction from the viewpoint is directed to a center of the group of objects. For the different background images of the group, the images differ in at least one of an elevation angle of the viewpoint and an azimuth angle of the viewpoint. The viewpoint may be such that a virtual user located around the group of objects looks upon the group of objects from a certain height, i.e. elevation angle, and also looks onto the group of objects with a certain azimuth angle relative to a predefined direction which is defined as the angle between a predefined direction (e.g. North) and the line of sight from the view point to the center of the group of objects. The background image can be an image with pixels provided in rows and columns. The image pixels representing an object in the background image can have a certain color value, e.g. an RGB value. Pixels in the background image which do not represent an object can be transparent pixels. These pixels which are in a transparent state help to display different groups of objects. When different background images of different groups of objects are used to generate the 3-dimensional map view, these different background images can be superimposed and may be displayed as superimposed images. In this embodiment different groups of objects can be displayed easily, as for the 3-dimensional map view only the different background images representing the different groups of objects are identified and superimposed. The stack of background images can be generated based on the distance of the group of objects from the view point, so that a group of objects located closer to the view point would hide a group of objects located at a greater distance in the same viewing direction.

The viewing direction in the background image can be directed to the geometric center of an area covered by a group of objects. This means that in each background image the viewing direction is directed to the center of the group of objects which is shown in the corresponding background image.

It is possible that in the background images of each group of objects a predefined number of different viewing directions between 0° and 360° azimuth angle may be used and a predefined number of elevation angles between 0° and 90° may be used. Each background image of the group differs in at least one of the viewing direction and the elevation angle.

For the generation of the 3-dimensional map view it is possible to determine the objects which should be considered when generating the map view. To this end it is possible to take into account only those objects or the group of objects which are located within a cone of light which is emitted from the viewpoint with a predefined opening angle. The viewpoint may have a certain elevation, which may be freely selected by the user or which may correspond to the position of the navigation system. From this viewpoint the cone of light is directed into the viewing direction with a certain opening angle. The line of sight generated by the cone of light can be directed slightly downwards so that only objects or a group of objects are considered which are located within the line of sight defined by the cone of light emitted from the viewpoint with a certain opening angle. The cone of light can be designed in such a way that the horizontal opening angle is the same as the vertical opening angle. However, the vertical opening angle of the cone of light may also differ from the horizontal opening angle.

The geographic map data may contain a terrain model, including, in addition to the latitude and longitude of a geographical object, the vertical height of the object. For generating the 3-dimensional map view it is also possible that a terrain model of the part of the geographic map data that is displayed is generated, and for generating the 3-dimensional map view the calculated objects and the selected background images are superimposed on the terrain model. With such a terrain model a realistic representation of the surrounding scenery is possible. The predefined distance which determines whether a representation of an object is calculated using the corresponding data set or whether a group of objects is displayed using the corresponding background image may be a predefined value, e.g. between 100 and 1000 meters. This predefined distance may be a fixed value; however, it is also possible that this value may be configured either by the user or the manufacturing company of the navigation system.

Preferably, the 3-dimensional map view is generated of an urban agglomeration, wherein the urban agglomeration covers a certain geographical area. This geographical area may be divided into different parts and the objects located in one part of the geographical area are grouped to one group of objects. Depending on the size of the urban agglomeration the number of parts and therefore the number of groups of objects may vary. With the presence of the different background images for an urban agglomeration the generation of a 3-dimensional map view showing objects within the urban agglomeration is greatly facilitated. However, the 3-dimensional map view is not restricted to cities or the like. The map view with the background images may be generated in any region of a geographical map, be it outside or inside a city boundary.

According to a further aspect a navigation system configured to generate the 3-dimensional map view is provided. The navigation system comprises the database including the geographic map data. The database is designed as described above and includes map data, the data sets for the plurality of objects and the background images. The navigation system furthermore comprises a positioning module configured to determine a position of the user to which the 3-dimensional map view is to be displayed. The positioning module furthermore determines a viewing direction for the user and the elevation for the user from which the map view is viewed.

The navigation system furthermore contains a map viewer configured to generate the 3-dimensional map view of the map data. The map viewer is configured to calculate the position and representation of each object located within a predefined distance to the position of the user and to display the objects at the determined position as calculated. The map viewer is furthermore configured, for objects located outside the predefined distance, to identify at least one group of objects to which the objects belong, and to select and display for each of the at least one group the background image in which the 3-dimensional objects of the corresponding group are shown from the determined viewing direction and elevation. A display of the navigation system is configured to display the generated map view.

The map viewer is configured in such a way that it generates the map view as it is viewed from a viewpoint with a determined viewing direction. In this context the positioning module can be configured in such a way that it determines a heading direction in which the user of the navigation system is heading to. The map viewer then uses this heading direction as the viewing direction with which the map view is viewed.

The 3-dimensional map view may be a bird's-eye view.

It is to be understood that the features mentioned above and those to be explained below can be used not only in the respective combinations indicated, but also in other combinations or in isolation.

BRIEF DESCRIPTION OF THE DRAWINGS

The foregoing and other features of embodiments will become more apparent from the following detailed description of embodiments when read in conjunction with the accompanying drawings. In the drawings like or identical reference numerals refer to like or identical elements.

DETAILED DESCRIPTION

Figure 1:
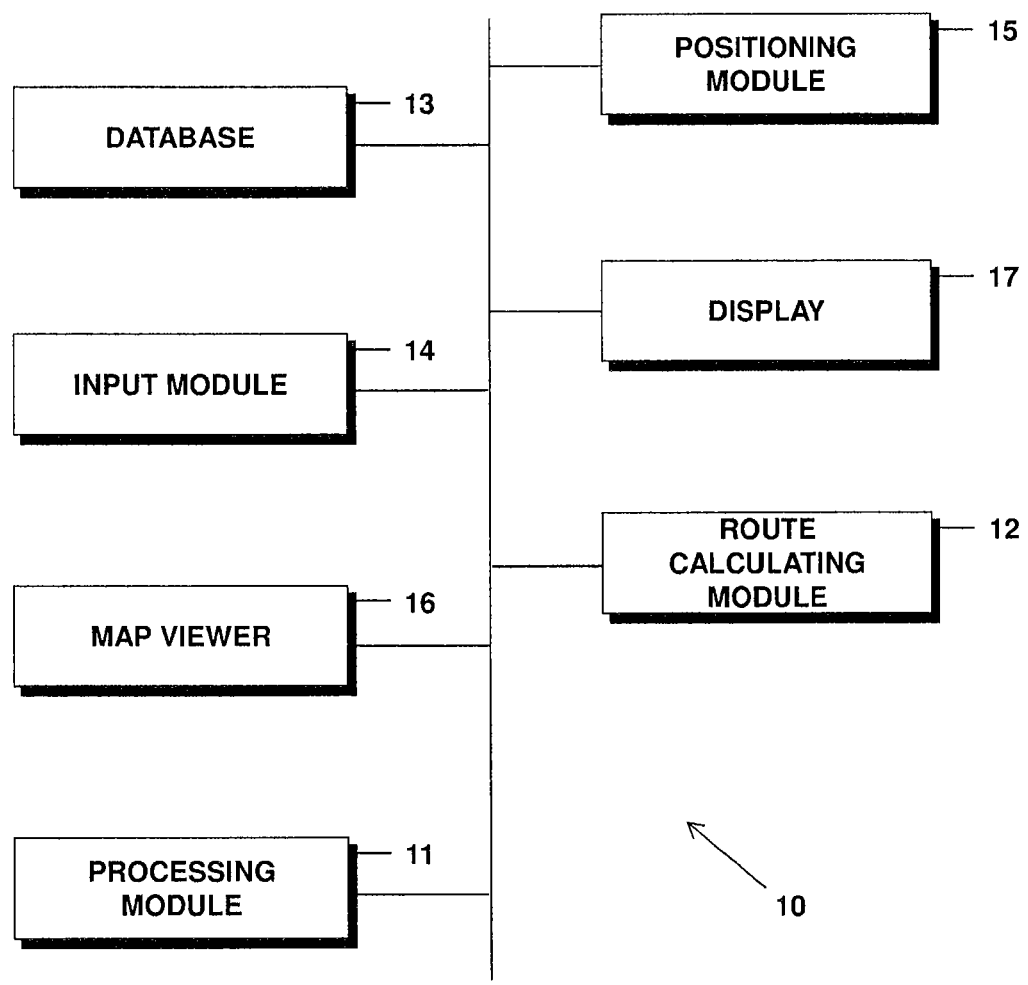
FIG. 1 is a schematic illustration of a navigation system with which a 3-dimensional map view is generated.

The drawings are to be regarded as schematic representations and elements illustrated in the drawings are not necessarily shown to scale. Rather, the various embodiments or elements are represented such that their function and general purpose become apparent to the person skilled in the art. Any connection or coupling between functional blocks, devices, components or other units may be implemented by a direct or an indirect connection or coupling.

FIG. 1 schematically illustrates a navigation system. The navigation system 10 comprises a processing module 11 which controls the operation of the navigation system. The processing module 11 may comprise a central processing unit, for example in form of one or more microprocessors, digital signal processors, or application-specific integrated circuits. The navigation system furthermore comprises a route-calculating module 12 which calculates a route from a certain location, e.g. the present position of the navigation system or any other position to a desired destination. A database 13 is provided. The database may comprise anyone or any combination of various types of memories, such as a random access memory, flash memory or hard drive, but also removable memories, such as a compact disk, DVD, a memory card or the like. The database 13 includes geographic map data and a plurality of objects. For each object a data set is available with which a 3-dimensional representation of an object is possible. The data sets are provided such that for each object the exact geographical position of the object in the map data is known. The database 13 furthermore contains a plurality of background images in which a group of objects is shown from different viewing directions and/or elevation angles. The navigation system furthermore contains an input module 14, e.g. as part of a human-machine interface, with which a user can input destinations, determine configurations of the navigation system, etc. The input module 14 may be inter alia used to set an elevation which is used as a virtual viewpoint from which the 3-dimensional map view is viewed. A positioning module 15 is adapted to determine the current position of the navigation system. If the navigation system is incorporated in a vehicle, it determines the current position of the vehicle in which the system is installed. However, the navigation system may also be a hand-held system. A map viewer 16 is provided to generate the 3-dimensional map view that can be displayed on a display 17.

In operation the navigation system 10 outputs a 3-dimensional map view, as will be explained in more detail below.

It should be understood that the navigation system shown in FIG. 1 may include additional components not shown in the figure. By way of example, the positioning module may comprise a position sensor with which the position of the navigation system is determined. Furthermore, an interface for wired or wireless communication with other components outside the navigation system may be provided. Furthermore, it should be understood that the different functional features or modules shown in FIG. 1 need not to be provided in the shown separation of modules. Different functions may be combined in one module. Furthermore, the different modules may be incorporated by hardware, software or a combination of hardware and software.

Figure 2:
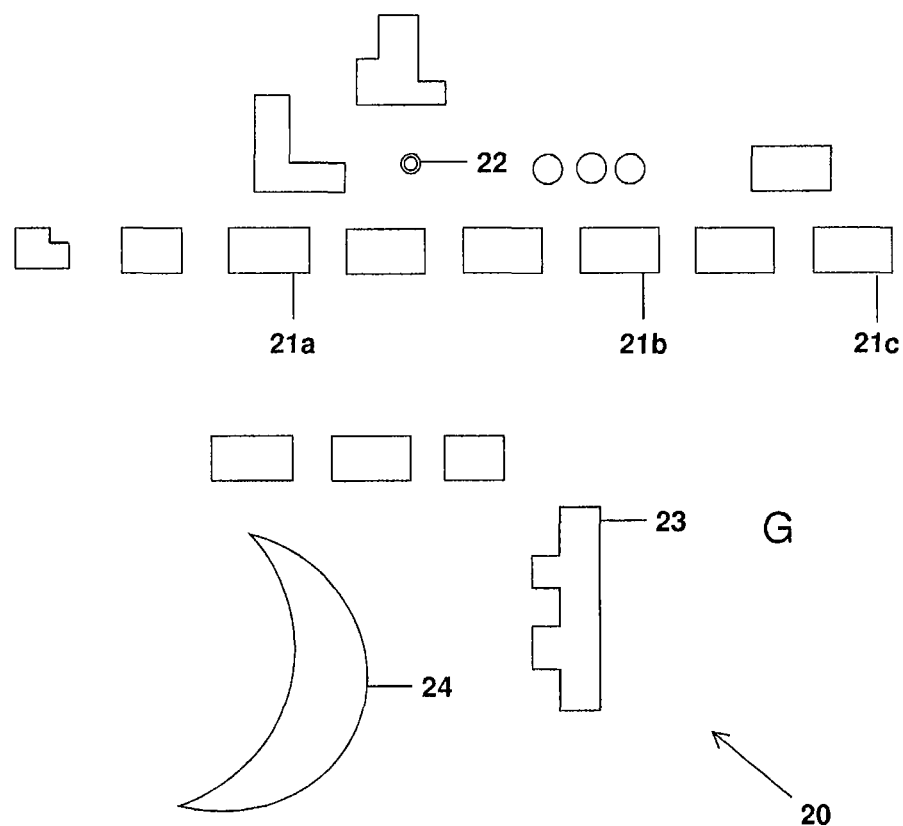
FIG. 2 is a schematic plan view of a group of objects.

In the following the structure of the database 13 including the data sets for the 3-dimensional representation of objects and the background images is explained in more detail. Especially the plurality of background images contained in the database 13 are explained in more detail together with their use. The background images stored in the database may represent different objects located in a city or urban agglomeration. Especially in an urban agglomeration a 3-dimensional map view may be helpful to distinguish different roads. The navigation system 10 of FIG. 1 generates a 3-dimensional map view with driving recommendations e.g. in the form of arrows or highlighted road segments. The 3-dimensional representation of the map view showing the surrounding of the navigation system in a driving direction (vehicle) or moving direction (stand-alone navigation system) is used to indicate which road segment or road to take. If the position and representation of each 3-dimensional object, such as buildings, points of interests, statues, are calculated in real time for displaying, the computation effort is very high. The computing resources can be minimized by using pre-rendered background images. In FIG. 2 a group of objects 20 is shown. A certain geographical area, e.g. the area within an urban agglomeration, may be divided into different parts and the objects located in one of the parts can be grouped to a group of objects 20, such as the objects shown in FIG. 2. The group of objects may contain different buildings, such as the buildings 21a-21c, a tower 22, another building 23 and a further building 24. The objects are not restricted to buildings, the objects may include POIs, landmarks or any other part present on a geographic map.

Figure 3:
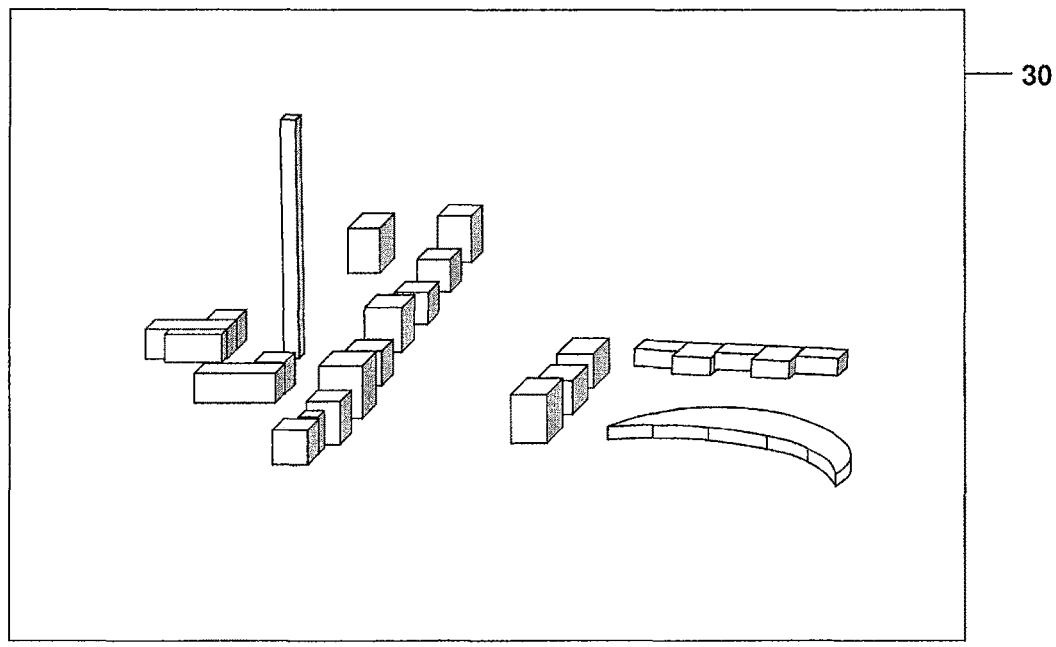
FIG. 3 is a schematic view of the group of objects shown in FIG. 2 shown in a background image from a certain elevation and a certain viewing direction.
Figure 4:
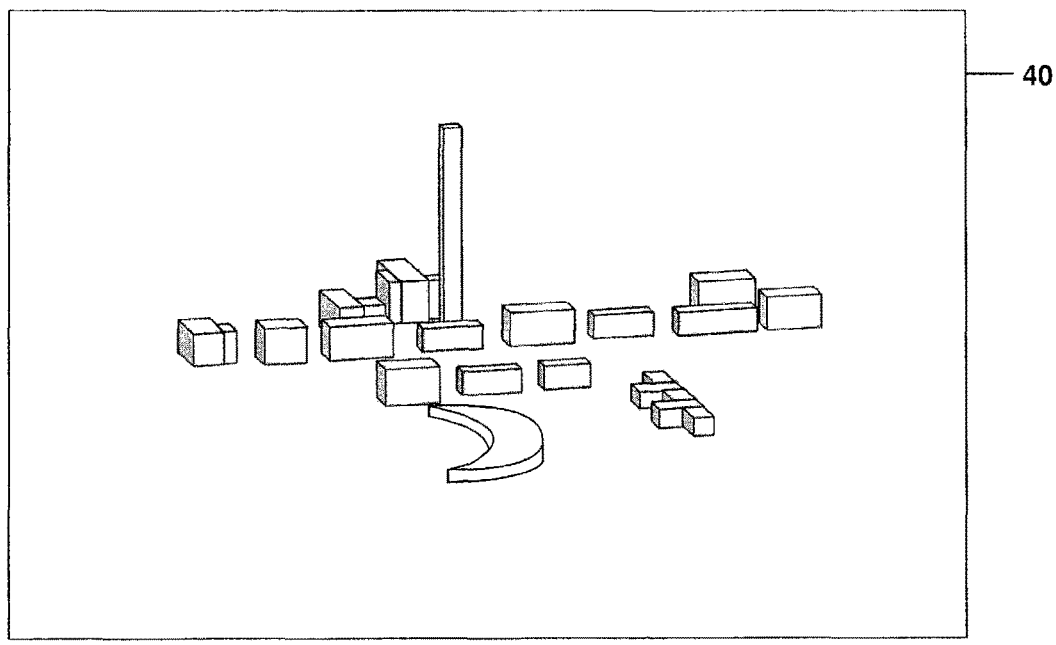
FIG. 4 shows the group of objects in another background image in which the group of objects shown in FIGS. 2 and 3 are shown in another viewing direction and/or elevation.

In FIG. 3 the group of objects shown in FIG. 2 is shown in one possible pre-rendered background image 30 of the group of objects 20 shown in FIG. 2. In FIG. 3 the group of objects is viewed from a certain viewpoint with a certain elevation angle and viewing direction. In FIG. 4 another background image 40 showing the same group of objects 20 is shown from another viewing direction and another elevation angle. In the database 13 for each group of objects a variety of different background images showing the same group of objects from different elevation angles and/or viewing directions is stored. The number of background images for one group of objects may vary in dependence on the number of objects or form of the objects shown in the group. By way of example the number of different background images for one group may be between 5 and 25.

A certain geographical area, such as an urban agglomeration or all objects within the boundaries of a city, a village, etc. can be divided into different smaller geographical areas, each geographical area containing a certain number of objects grouped to a group.

Figure 5:
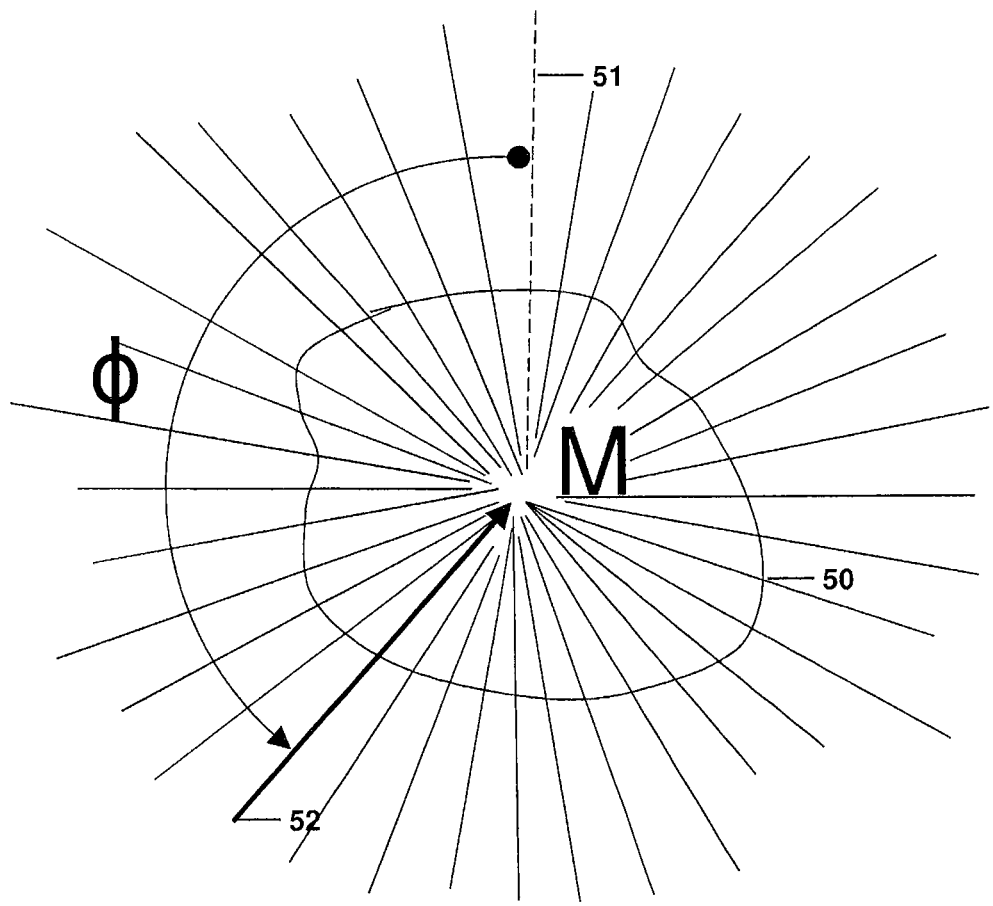
FIG. 5 is a schematic view illustrating how a viewing direction in the horizontal plane to a group of objects is determined.
Figure 6:
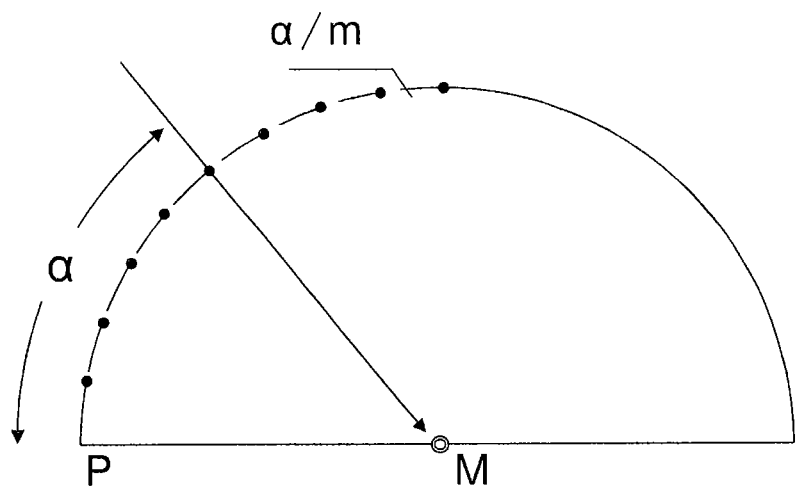
FIG. 6 shows a schematic side elevation view showing different elevation angles which are used to look at a group of objects.
Figure 7:
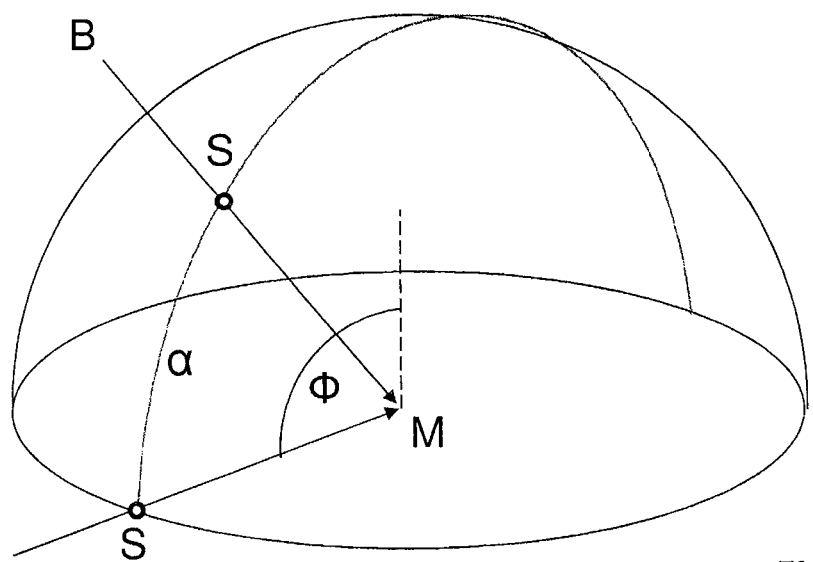
FIG. 7 shows a schematic 3-dimensional view of a group of objects viewed from a viewpoint with a certain viewing direction.

In connection with FIGS. 5-7 it is explained in more detail how the different background images stored in the database were generated. Each background image showing a group of objects covers an area, such as the area 50 shown in FIG. 5. For generating a background image, a viewing direction is directed to a geometric center M of the area covered by the group of objects. For each group different viewing directions can be used, the viewing direction being defined by the angle $\phi$ shown in FIG. 5. The horizontal viewing direction $\phi$ is the angle defined between a certain predefined viewing direction 51, e.g. a direction heading north, and the current viewing direction 52 from the view point to the center of the group of objects indicated by the arrow 52. As indicated in FIG. 5, different horizontal viewing directions may be used with predefined azimuth angles $\phi$, with $\phi=360°/n$, with n being an integer. In the embodiment shown in FIG. 5 a large variety of different horizontal viewing directions is possible, e.g. a number up to 20. However, it should be understood that a smaller amount of viewing directions, i.e. a smaller number of angles $\phi$ may be used, e.g. a total number of 4 to 8.

In FIG. 6 the second variable responsible for determining a 3-dimensional map view is shown. The map view furthermore depends on the elevation angle α with which the group of objects is viewed. The angle α may have different values, e.g. values calculated by the formula α=90°/m, with m being an integer. In the embodiment shown, nine different elevation angles are possible, however, any other is possible. In FIG. 7 the corresponding situation of FIGS. 5 and 6 is shown in a 3-dimensional view. The background images of a group of objects are generated using different elevation angles α and different azimuth angles φ. The size of the objects shown in the background image depends on the distance from the group of objects. In the embodiment shown in FIG. 7 a certain radius is used to indicate the distance from which the image is taken, S being the viewpoint and S' being another viewpoint, B representing a certain viewing direction at a certain elevation angle.

Figure 8:
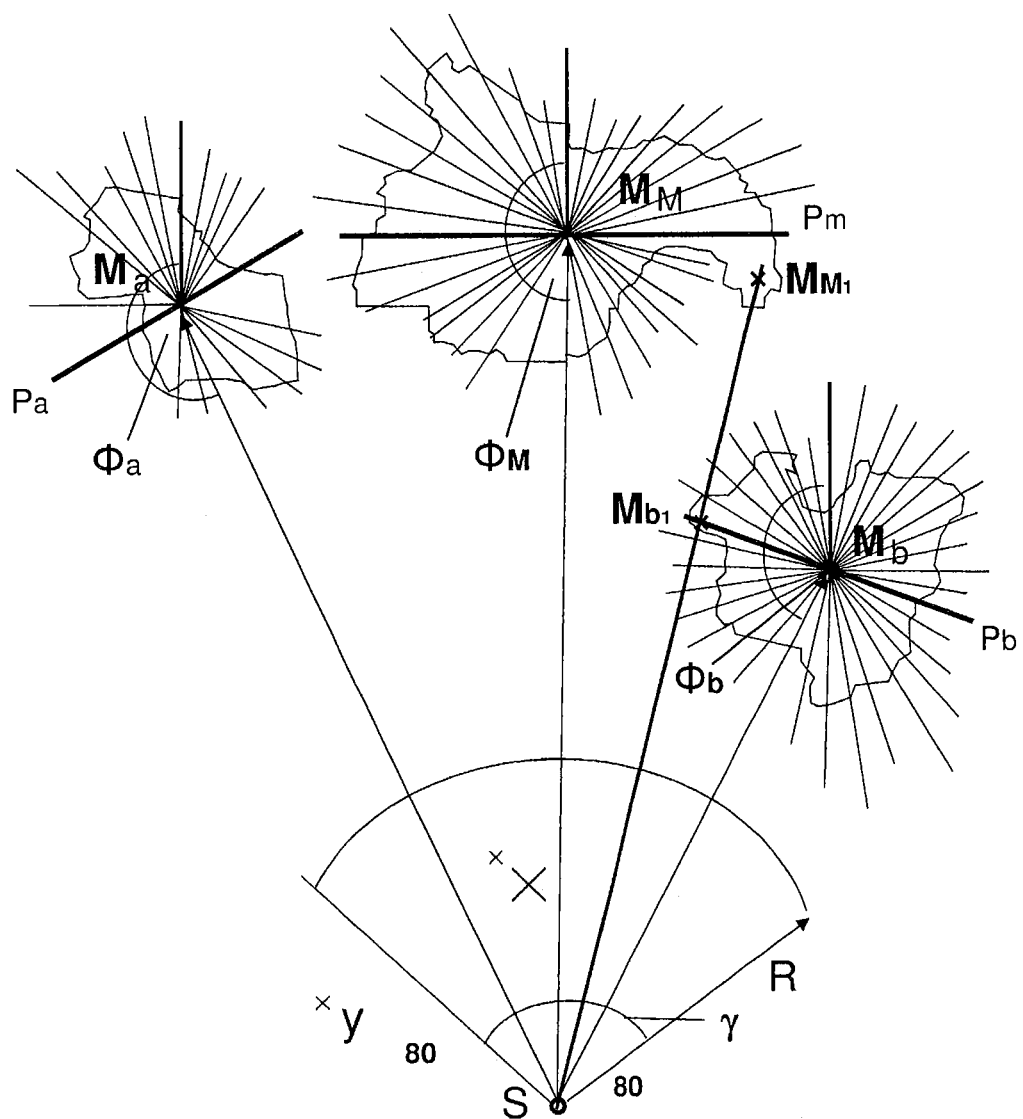
FIG. 8 shows a schematic illustration how different background images for different groups of objects are identified and displayed.
Figure 9:
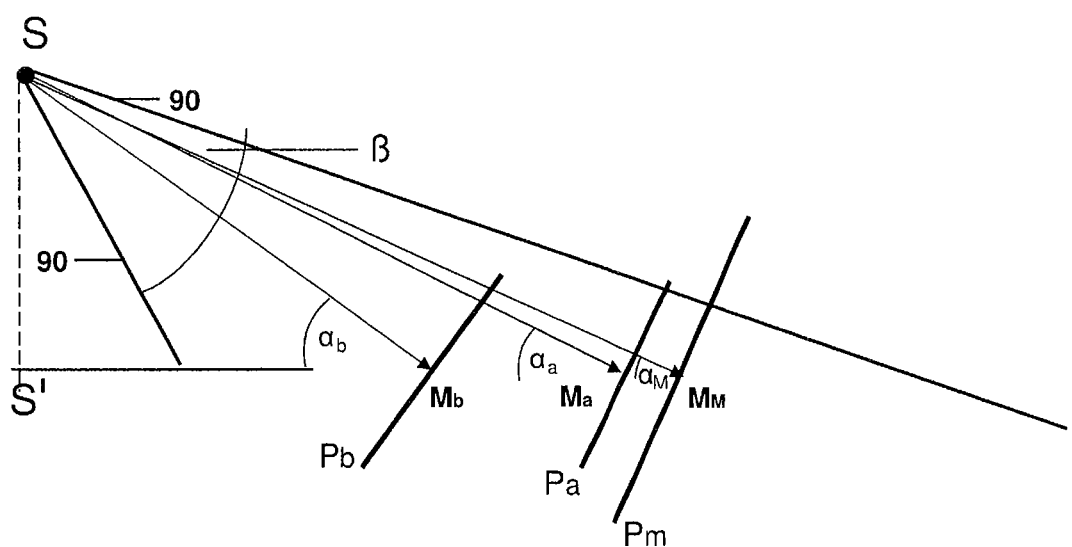
FIG. 9 shows a schematic side view of the situation shown in FIG. 8.

In connection with FIGS. 8 and 9, the generation of the background part of the 3-dimensional map view is explained in more detail. In the embodiment shown the 3-dimensional map view is generated from a viewpoint as shown in FIGS. 8 and 9. In the example shown three groups of objects are identified which should be displayed in the 3-dimensional map view, a first group of objects with a center Ma, a second group of objects located at a center Mm and a third group of objects located at the position Mb. As shown in FIG. 8, from the viewpoints the different groups of objects appear at different viewing directions, the first group of objects appears under the azimuth angle φa, the second group appears under the azimuth angle φm and the third group appears under the azimuth angle φb. The azimuth angle is determined by determining the horizontal position of the viewpoint and the center position Ma, Mm and Mb of the different groups. The line of sight from the viewpoint S to the different centers Ma, Mm and Mb determines the azimuth angle under which the corresponding group of objects is viewed.

In connection with FIG. 9 the corresponding elevation angle is indicated. Each of the groups is viewed from a different elevation angle as the groups are located at different distances to the view point, the elevation angle further depending on the elevation or altitude of the viewpoint S above ground. This altitude may be selected by the user or may be predefined in the navigation system. As shown in FIG. 9, from the viewpoint S the group of objects located at the center Mb appears under the elevation angle αb, whereas the group of objects located at Ma appears under the elevation angle αa and the group of objects located at Mm appears under the elevation angle αm. The position S' corresponding to the position of the viewpoint at ground level can be determined by the navigation system using the position module, e.g. using the GPS signal or a Galileo signal or using other signals adapted to provide a position. When the azimuth angle and the elevation angle for each group of objects is known, the corresponding background images can be selected from the database. The corresponding background images can then be superimposed and displayed as superimposed images. As can be seen in FIGS. 8 and 9, the different groups of objects are located at different positions. In each background image showing a single group the pixels showing an object, e.g. one of the objects shown in FIGS. 2-4, have a color value or a gray scale value. The other pixels where no object is present in the background image may have a transparent pixel value and are thus transparent so that the different objects are visible on the displayed screen at the same time. If an object belonging to one group is located closer to another object belonging to another group, by way of example in the embodiment of FIG. 8 an object belonging to group B compared to an object belonging to group M, the pixel in the foreground having a pixel value which is not transparent hides an object located behind. In the example of FIG. 8 this means that the object MB1 covers the object MM1 located in the background, so that the user will only see object MB1. However, the other pixels in which no object is displayed are transparent so that pixels in the background representing an object are visible in the displayed image.

In the embodiment shown in FIG. 9 the terrain is considered flat. However, it should be understood that the map data may also contain the height of the geographic map data. Using the height it is possible to generate a terrain model of the geographic map data. This means that the different groups shown in FIG. 9 might be located at different altitudes. This altitude is also taken into account when determining the elevation angle from the desired viewpoint.

In connection with FIGS. 8 and 9 it is explained in further detail which of the objects are shown in the background images and which of the objects are calculated at real time with the correct viewing direction and elevation. In FIG. 8 a distance R is shown. All objects located within this distance R are calculated on the fly, meaning that their representations are calculated when the image viewer prepares the image to be displayed. For each 3-dimensional object the position with the geographic map data is known. As the viewpoint S is known, it is possible to calculate the representation of the object using a data set provided for each object, which allows the 3-dimensional representation of an object from different distances, viewing directions and elevation angles. In the embodiment shown an object located at the position X will be displayed by calculating the representation of the object. However, it should be understood that not all objects located within a predefined distance are displayed on the navigation system. By way of example an object located at position Y shown in FIG. 8 is not displayed, as it is not located in a cone of light determined by the two lines 80 which determines the field of view presented to the user in the 3-dimensional map view. In the horizontal plane a certain opening angle γ determines the field of view. In FIG. 9 the light cone is also shown having a certain opening angle in the vertical direction defined by the two lines 90. All objects located in the vertical opening angle β and all objects located in the horizontal opening angle γ are considered when generating the 3-dimensional map view. For all objects located inside the distance R, the representation of the object is calculated, and all objects located outside this distance R are identified and the group of objects to which the different objects belong are determined and for each group the corresponding background image is selected in accordance with the determined elevation and viewing direction. When the user is moving, the situation may occur that an object of a group displayed in a background image is located closer than the predefined distance R. In such a situation the object is rendered in real time which means that the representation of the object is calculated when it is displayed. The calculated object is then located in front of the corresponding background image in which the same object is also present. This may generate an image artifact in the displayed 3-dimensional map view, but this artifact may be hardly visible in the displayed map view. Furthermore, the predefined distance can be selected in dependence on the size of the objects to be displayed. With a proper selection of R in dependence on the object size, this artifact can be minimized.

Figure 10:
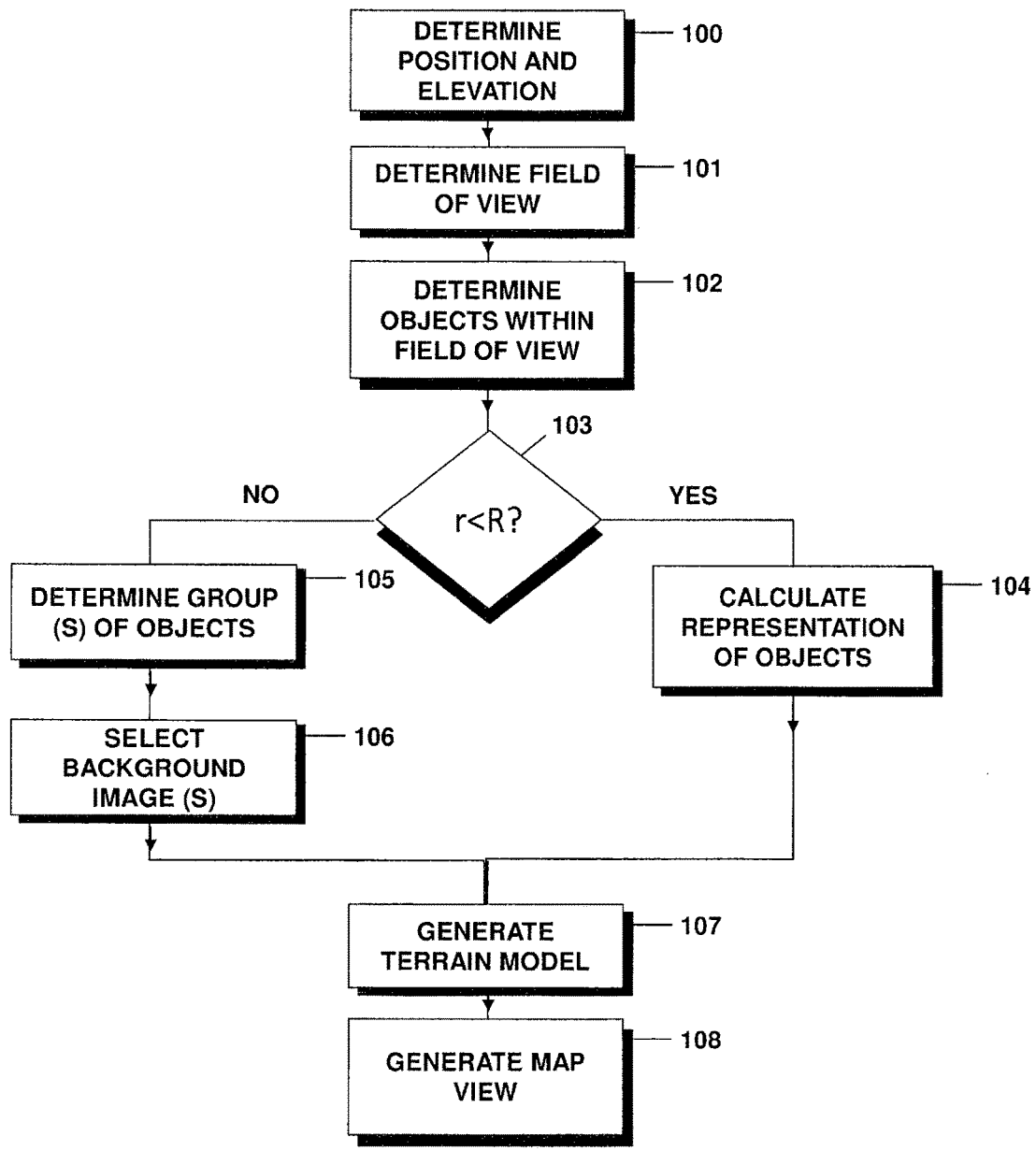
FIG. 10 shows a flowchart including the steps that are carried out to generate a 3-dimensional map view.

In connection with FIG. 10 a flowchart is discussed which contains the main steps used to generate the 3-dimensional map view. For generating the map view the position and elevation of the viewpoint from which the 3-dimensional map view is to be viewed is determined (step 100). The position may be determined by the navigation system. Furthermore, the heading direction can be determined. When the navigation system is moving, it can be determined from the previous positions in which direction the navigation system is heading. The elevation can be a preset value or a value configurable by the user. When the position, elevation and heading direction is known, it is possible to determine in step 101 the field of view. As was discussed above in connection with FIGS. 8 and 9, the field of view is determined by the cone of light which is defined by a horizontal opening angle and a vertical opening angle. When this field of view defined by the cone of light is determined, it is possible to determine the objects located within the field of view (step 102). In the next step it is possible to classify the objects. If the objects are located closer to the present position than the predefined distance R, the representation of the objects is calculated when the 3-dimensional map view is generated. If the objects are located outside the predefined distance R, the representation of the objects is not calculated, but a corresponding background image is selected from the database. Step 103 represents this classification step. For the objects located within the predefined distance R the representation of the object is calculated in step 104. For the other objects the group of objects or the groups of objects are determined in step 105 to which the objects belong. In the embodiment discussed above in FIGS. 8 and 9, three different groups were determined. With the knowledge of the viewpoint and the elevation, it is possible to select the corresponding background image from the stored plurality of background images in step 106. The information calculated in step 104 and 106 can be fused and with the generation of the terrain model taking into account the height data of the different objects (107) it is possible to determine and generate the map view in step 108.

Summarizing, as explained above, a method and a navigation system is provided with which a 3-dimensional map view can be generated at low computational cost, as not all the objects have to be rendered when the 3-dimensional map view is generated. The objects located in the background are displayed by selecting a corresponding background image. The embodiments described above can be used when displaying a 3-dimensional map view of an urban agglomeration or a city. However, it should be understood that the above-described embodiments may also be used outside an urban agglomeration in the countryside. In this example the number of objects to be displayed may be less prominent. However, nevertheless the above-described embodiments can also be used outside a city.

While embodiments have been described with reference to the drawings, various modifications may be implemented in other embodiments. Furthermore, it should be understood that each of the features described in one of the embodiments above may be used in any of the other embodiments alone or in combination with any of the other features described above.

What is claimed is:

1. A method for generating a 3-dimensional map view of a navigation system, the method comprising:
    determining a position, a viewing direction, and an elevation of the navigation system to which the 3-dimensional map view is to be displayed;
    for each object in a plurality of objects:
        determining whether the object is within a predefined distance relative to the position,
        if the object is within a predefined distance relative to the position, then calculating a representation of each object based at least in part on the viewing direction and the elevation, and
        if the object is not within a predefined distance relative to the position, then
            identifying an object group in a plurality of object groups to which the object belongs, and
            selecting a background image from a plurality of background images associated with the object group based at least in part on the viewing direction and the elevation of the navigation system, wherein for each object group, each background image from the plurality of background images associated with the object group is associated with a different viewpoint, and the viewing direction from the viewpoint is directed to a center of the object group, wherein for the different background images of the plurality of background images, the images differ in at least one of an elevation angle of the viewpoint and an azimuth angle of the viewpoint, wherein the selected background image is associated with a viewing direction that corresponds to the viewing direction of the navigation system;
    generating the 3-dimensional map view based on at least one calculated representation and at least one selected background image; and
    displaying the generated 3-dimensional map view.

2. The method according to claim 1, wherein in the background image, pixels representing an object in the background image have a color value and pixels in the background image which do not represent an object are transparent pixels.

3. The method according to claim 1, wherein different background images used for generating the map view of different groups of objects are superimposed and are displayed as superimposed images.

4. The method according to claim 1, wherein in the background image the viewing direction is directed to a geometric center of an area covered by the group of objects shown in the background image.

5. The method according to claim 1, wherein in the background images of each group of objects, a predefined number of different viewing directions between 0° and 90° and a predefined number of elevations angles between 0° and 90° are used, wherein each background image of the group differs in at least one of the viewing direction and the elevation angle.

6. The method according to claim 1, wherein for generating the map view only objects are taking into account and groups of objects which are located within a cone of light which is emitted from the viewpoint with a predefined opening angle.

7. The method according to claim 1, further including the step of generating a terrain model of geographic map data related to the 3-dimensional map view, wherein the at least one calculated representation and the at least one selected background image are superimposed onto the terrain model.

8. The method according to claim 1, wherein the predefined distance is between 200 and 1000 meters.

9. The method according to claim 1, wherein the 3-dimensional map view is generated of an urban agglomeration, wherein the urban agglomeration covers a geographical area, wherein the geographical area is divided into different parts, wherein the objects located in one part of the geographical area are grouped to one group of objects.

10. The method according to claim 1, wherein the 3-dimensional map view is generated in such a way that the map view is viewed from a viewpoint with the determined viewing direction.

11. The method according to claim 10, further comprising employing a cone of light emitted from the viewpoint with a predefined opening angle, wherein calculating a representation comprises calculating only the position of objects located within the predefined distance relative to the position and located within the cone of light, wherein selecting a background image comprises selecting a background image from a plurality of background images that is located within the cone of light and outside the predefined distance.

12. The method according to claim 1, further comprising receiving a selection of the desired elevation from which the 3-dimensional map view is viewed.

13. The method according to claim 1, further comprising:
   determining a heading direction in which the navigation system is heading to; and
   setting the heading direction as the viewing direction with which the map view is viewed.

14. A navigation system for generating a 3-dimensional map view, the navigation system comprising:
   a database including geographic map data, the geographic map data further comprising a plurality of objects;
   a positioning module that determines a position, a viewing direction, and an elevation of the navigation system to which the 3-dimensional map view is to be displayed;
   a map viewer that, for each object in the plurality of objects:
      determines whether the object is within a predefined distance relative to the position,
      if the object is within a predefined distance relative to the position, then calculates a representation of each object based at least in part on the viewing direction and the elevation, and
      if the object is not within a predefined distance relative to the position, then
         identifies an object group in a plurality of object groups to which the object belongs; and
      selects a background image from a plurality of background images associated with the object group based at least in part on the viewing direction and the elevation of the navigation system, wherein for each object group, each background image from the plurality of background images associated with the object group is associated with a different viewpoint, and the viewing direction from the viewpoint is directed to a center of the object group, wherein for the different background images of the plurality of background images, the images differ in at least one of an elevation angle of the viewpoint and an azimuth angle of the viewpoint, wherein the selected background image is associated with a viewing direction that corresponds to the viewing direction of the navigation system, and
   generates the 3-dimensional map view based on at least one calculated representation and at least one background; and
   a display that displays the generated 3-dimensional map view.

15. The navigation system according to claim 14, wherein the map viewer generates the 3-dimensional map view in such a way that the map view is viewed from a viewpoint with the determined viewing direction.

16. The navigation system according to claim 15, wherein the map viewer employs a cone of light emitted from the viewpoint with a predefined opening angle, wherein the map viewer only calculates the position of objects located within the predefined distance relative to the position and located within the cone of light, wherein the map viewer selects the background images of the group of objects located within the cone of light and outside the predefined distance.

17. The navigation system according to claim 14, further comprising an input unit that receives a selection of the desired elevation from which the 3-dimensional map view is viewed.

18. The navigation system according to claim 14, wherein the positioning module determines a heading direction in which the navigation system is heading to, the map viewer setting the heading direction as the viewing direction with which the map view is viewed.

* * * * *